(12) United States Patent
Hollar et al.

(10) Patent No.: US 12,444,847 B2
(45) Date of Patent: Oct. 14, 2025

(54) SYSTEMS AND RELATED ADAPTERS FOR PROVIDING POWER TO DEVICES IN A SYSTEM

(71) Applicant: Wiser Systems, Inc., Raleigh, NC (US)

(72) Inventors: Seth Edward-Austin Hollar, Raleigh, NC (US); Ryan Michael Tedrick, Raleigh, NC (US); Scott Fisher, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 0 days.

(21) Appl. No.: 18/535,636

(22) Filed: Dec. 11, 2023

(65) Prior Publication Data

US 2024/0136722 A1    Apr. 25, 2024

Related U.S. Application Data

(63) Continuation of application No. 17/684,827, filed on Mar. 2, 2022, now Pat. No. 11,876,310, which is a
(Continued)

(51) Int. Cl.
| | | |
|---|---|---|
| *G06F 1/20* | (2006.01) | |
| *G06F 1/26* | (2006.01) | |
| *H01Q 1/36* | (2006.01) | |
| *H01Q 9/26* | (2006.01) | |
| *H01Q 9/40* | (2006.01) | |
| *H04B 3/44* | (2006.01) | |

(Continued)

(52) U.S. Cl.
CPC .............. *H01Q 9/40* (2013.01); *G06F 1/266* (2013.01); *H01Q 1/36* (2013.01); *H01Q 9/265* (2013.01); *H04B 3/44* (2013.01); *H04L 12/10* (2013.01); *H04L 12/40045* (2013.01); *H04L 12/46* (2013.01); *H04W 88/085* (2013.01)

(58) Field of Classification Search
CPC ........... H01Q 9/20; H01Q 11/16; H01Q 11/18
USPC .......................................... 343/793
See application file for complete search history.

(56) References Cited

U.S. PATENT DOCUMENTS

| | | |
|---|---|---|
| 7,240,224 B1 | 7/2007 | Biederman |
| 8,391,886 B1 | 3/2013 | Thaper .................. H04W 12/06 |
| | | 455/414.1 |

(Continued)

FOREIGN PATENT DOCUMENTS

| | | |
|---|---|---|
| WO | WO 2007/106795 A2 | 9/2007 |
| WO | WO 2016/184889 A1 | 11/2016 |
| WO | WO 2017/083347 A1 | 5/2017 |

OTHER PUBLICATIONS

Notification Concerning Transmittal of International Preliminary Report on Patentability, PCT/US2018/019365, Aug. 27, 2019, 9 pages.

(Continued)

*Primary Examiner* — Binh B Tran
(74) *Attorney, Agent, or Firm* — Stanek Lemon Crouse & Meeks, PA

(57) ABSTRACT

A system for providing power to a device is provided. The system includes at least one gateway that provides power and/or data to at least one device in the system; and at least one adapter coupled to the gateway and the at least one device, wherein the adapter is configured to couple lengths of cable between devices that are daisy chained together. Related adapters are also provided herein.

13 Claims, 8 Drawing Sheets

Related U.S. Application Data continuation of application No. 15/903,221, filed on Feb. 23, 2018, now Pat. No. 11,271,317.

(60) Provisional application No. 62/462,418, filed on Feb. 23, 2017.

(51) Int. Cl.
  *H04L 12/10* (2006.01)
  *H04L 12/40* (2006.01)
  *H04L 12/46* (2006.01)
  *H04W 88/08* (2009.01)

(56) References Cited

U.S. PATENT DOCUMENTS

| | | | |
|---|---|---|---|
| 2007/0195939 A1 | 8/2007 | Sink | B60Q 1/2611 379/37 |
| 2008/0280569 A1 | 11/2008 | Hazani | H04L 5/14 455/74.1 |
| 2011/0241425 A1 | 10/2011 | Hunter, Jr. et al. | |
| 2011/0268446 A1 | 11/2011 | Cune | H04B 10/25753 398/79 |
| 2012/0173905 A1 | 7/2012 | Diab et al. | |
| 2012/0293390 A1 | 11/2012 | Shoemaker | H01Q 1/007 343/853 |
| 2013/0201316 A1* | 8/2013 | Binder | H04L 67/12 701/2 |
| 2013/0330086 A1* | 12/2013 | Berlin | H04B 10/808 398/115 |
| 2018/0131440 A1* | 5/2018 | Patel | H02J 50/12 |

OTHER PUBLICATIONS

Notification of Transmittal of the International Search Report and the Written Opinion of the International Searching Authority, PCT/US2018/019365, May 7, 2018, 14 pages.

* cited by examiner

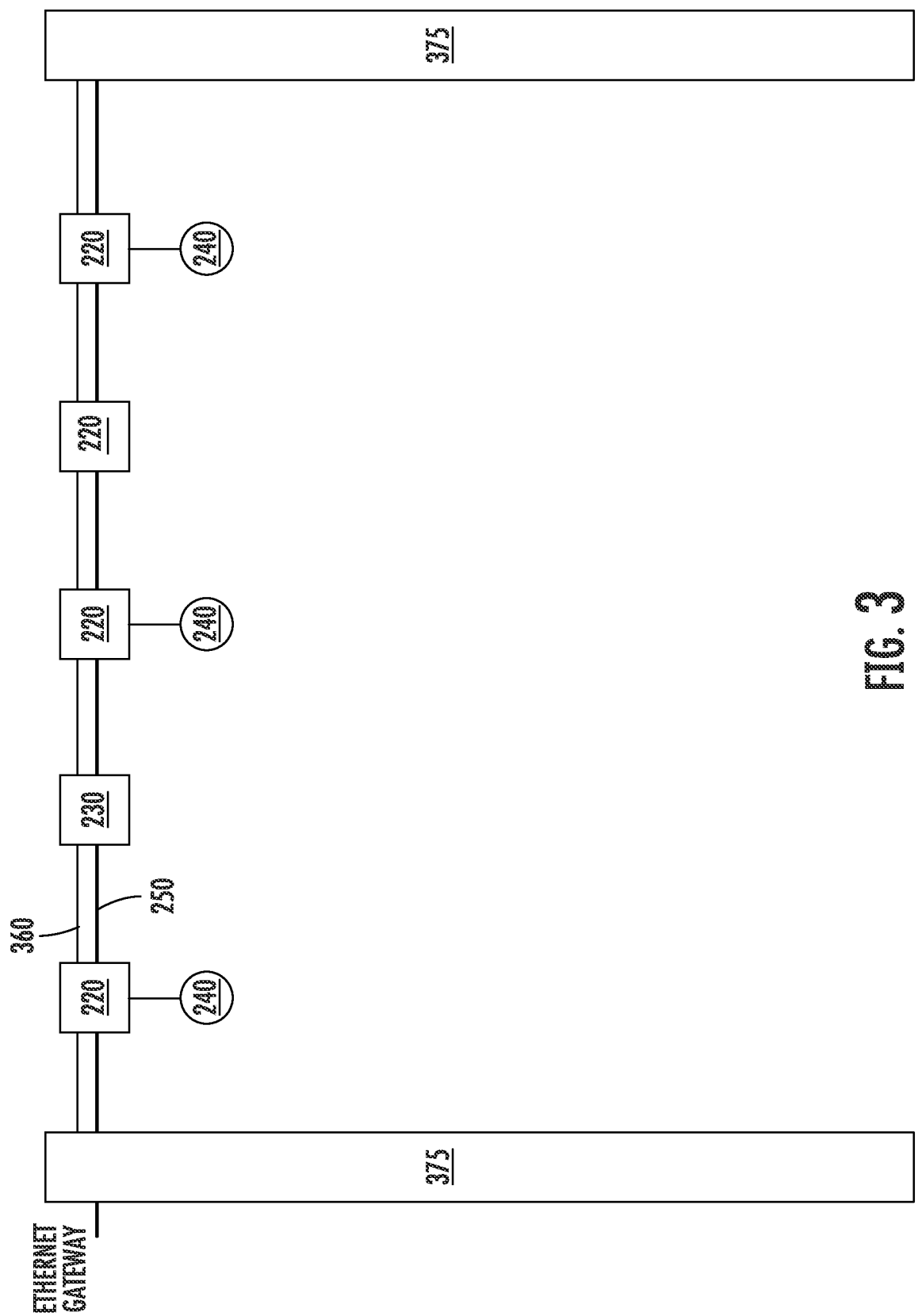

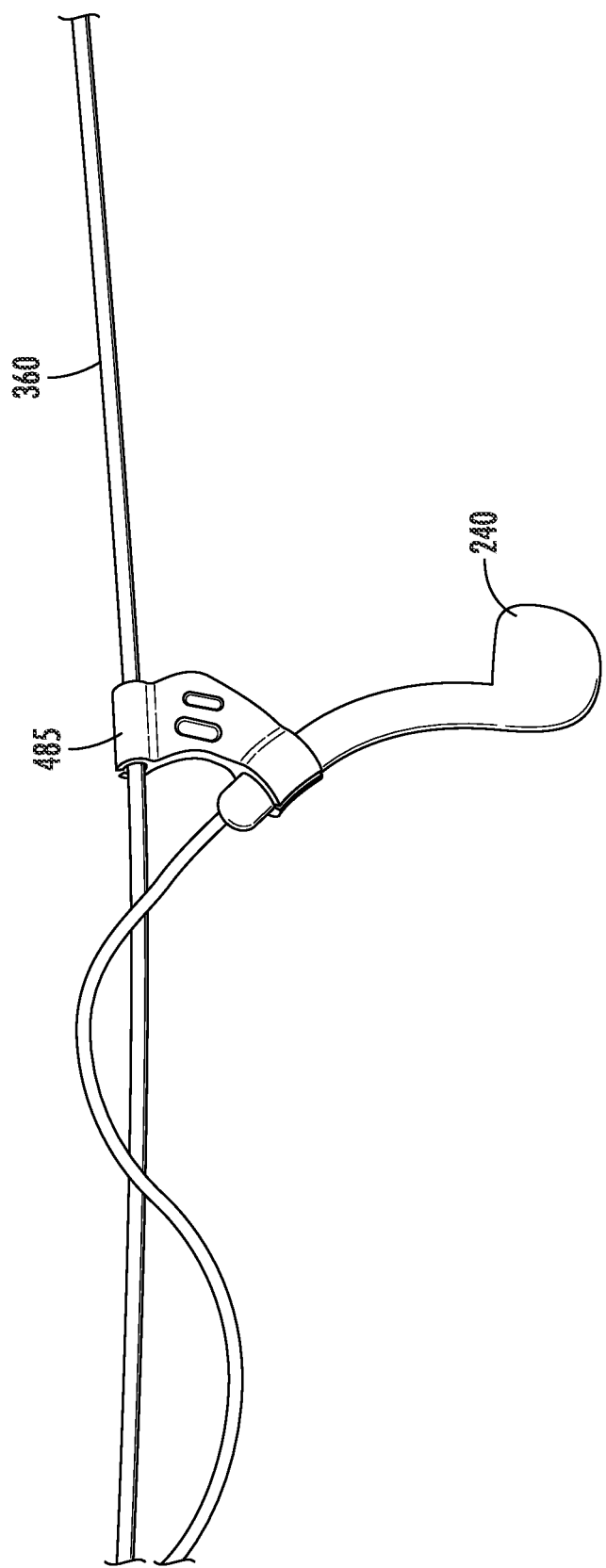

SYSTEMS AND RELATED ADAPTERS FOR PROVIDING POWER TO DEVICES IN A SYSTEM

CLAIM OF PRIORITY

The present application is a continuation of U.S. patent application Ser. No. 17/684,827, filed Mar. 2, 2022, which is a continuation of U.S. patent application Ser. No. 15/903,221, filed Feb. 23, 2018, which claims priority to U.S. Provisional Patent Application No. 62/462,418, filed Feb. 23, 2017, the disclosures of which are hereby incorporated herein by reference as if set forth in their entireties

FIELD

The present inventive concept relates generally antennas and, more particularly, to supplying power to antennas and related devices, methods and systems.

BACKGROUND

Devices that are powered conventionally, i.e., by being plugged into a wall receptacle or portable power supply, are limited to use in environments where such conventional power supplies are available. As wireless communications become the wave the future throughout the world, more creative ways of powering infrastructure to support these communications is desired.

SUMMARY

Some embodiments of the present inventive concept provide a system for providing power to a device. The system includes at least one gateway that provides power and/or data to at least one device in the system over a single cable; and at least one adapter coupled to the gateway and the at least one device using the single cable, wherein the adapter is configured to couple lengths of the single cable between devices that are daisy chained together.

In further embodiments, the at least on device may be an antenna and the adapter may be coupled to the antenna that is powered by the system.

In still further embodiments, at least one of the at least one adapters may be a combination adapter and antenna.

In some embodiments, the at least one device may include a plurality of antennas and/or antenna-adapter combinations and the at least one gateway, the at least one adapter and the plurality of antennas and/or antenna-adapter combinations may be coupled using the single cable configured to provide power and/or data.

In further embodiments, the at least one gateway, the at least one adapter and the plurality of antennas and/or antenna-adapter combinations may be separated by a distance of no greater than one hundred feet and the plurality of antennas and/or antenna-adapter combinations may include up to at least ten.

In still further embodiments, the adapter may further include a power switch that is configured to be remotely triggered allowing devices to be switched on and off at different times to avoid large voltage bounces that disrupt the system.

In some embodiments, the at least one gateway and/or the at least one adapter may be configured to store data related to health of the system and communicate the stored data automatically at a predetermined time or upon request by another device.

In further embodiments, the at least one gateway may be further configured to receive data from the at least one device in the system.

In still further embodiments, the at least one gateway may further include a universal serial bus (USB) connection configured to connect to a device to increase a number of devices in the system.

In some embodiments, the at least one gateway may be further configured to perform an automatic detection algorithm to discover all devices in the system.

In further embodiments, the gateway may be an Ethernet gateway.

Still further embodiments of the present inventive concept provide an adapter for providing power to a plurality of devices in a system using a single cable. The adapter is coupled to a gateway that provides power and/or data to the plurality of devices using the single cable and is configured to couple lengths of the single cable between devices that are daisy chained together.

BRIEF DESCRIPTION OF THE DRAWINGS

FIG. 3 is a block diagram of a system in accordance with embodiments of the present inventive concept configured to function in a large warehouse environment.

FIG. 4 is a diagram of an antenna in accordance with embodiments discussed herein configured to be attached to a cable as shown in FIG. 3.

DETAILED DESCRIPTION

Figure 1:
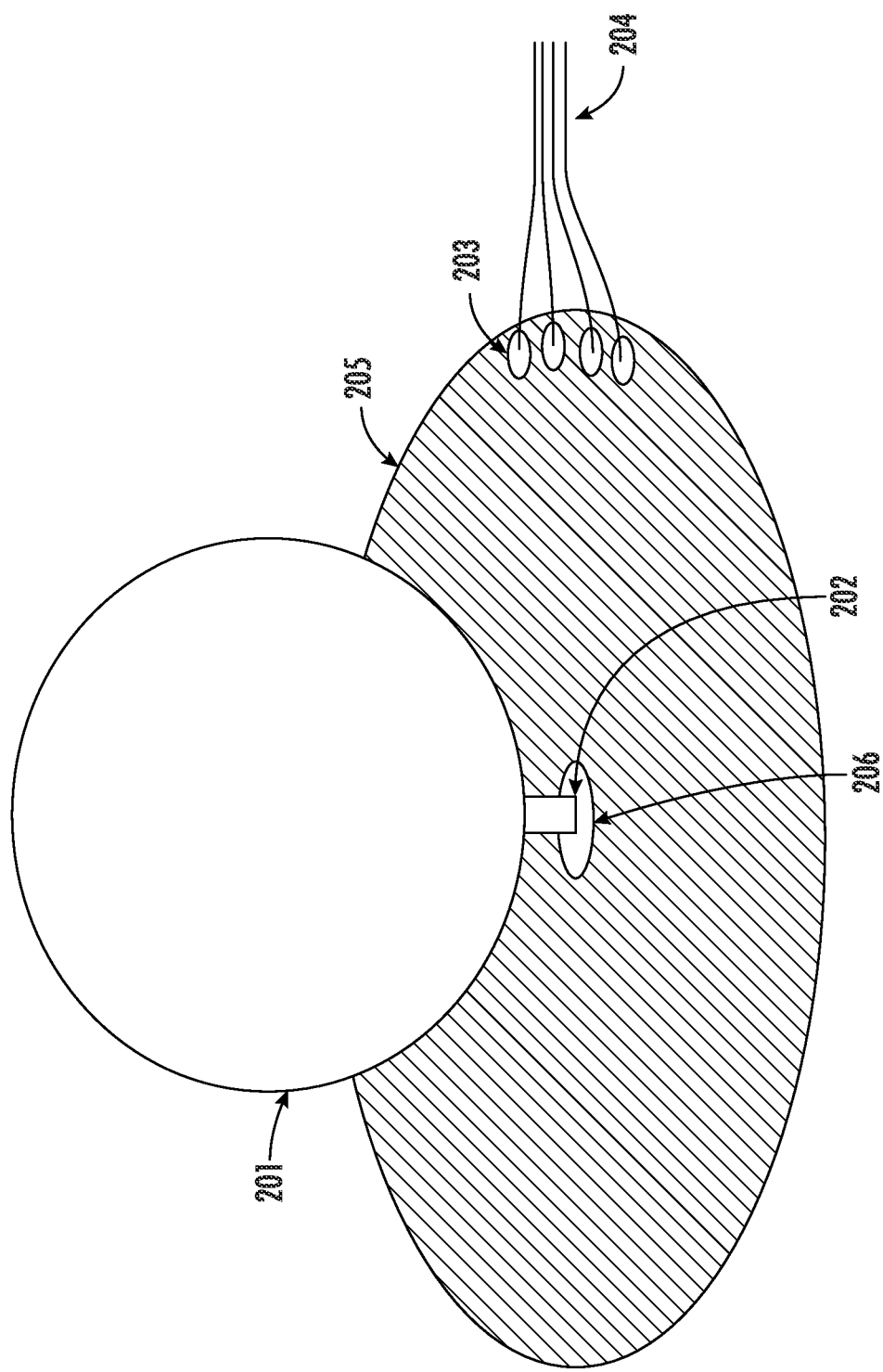
FIG. 1 is a block diagram an antenna in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, conventional methods of powering a device may lead to limited uses for the device as the world moves towards wireless devices and communications. Thus, some embodiments of the present inventive concept provide methods, systems and devices to provide power over cables to a plurality of devices without having multiple power drops or using batteries that have to be routinely replaced. For example, in some embodiments, power is provided to a plurality of devices over Ethernet. However, it will be understood that embodiments of the present inventive concept are not limited to this configuration. Furthermore, although embodiments of the present inventive concept are directed to providing power to antennas over Ethernet, embodiments of the present inventive concept are not limited to this configuration as will be discussed further below with respect to FIGS. 1 through 7.

Referring first to FIG. 1, an example antenna that can be used in combination with gateways and adapters in accordance with some embodiments of the present inventive concept will be discussed. As illustrated in FIG. 1, the antenna includes a radiating element 201, a conducting tab 202, connection points 203 and wires 204 connected thereto, a printed circuit board (PCB) 205 and a hole 206 in the PCB 205. As further illustrated, the radiating element 201 is orthogonal to the PCB 205. The hole 206 in the PCB 205 provides a pathway for the radiating element 201 to connect to RF circuitry (not shown) on the PCB 205 via the narrow conducting tab 202. It will be understood that electronics can be placed on a top or bottom surface of the PCB 205 without departing from the scope of the present inventive concept. In some embodiments, the hole 206 in the PCB 205 may be metalized, for example, coated with a metal. In these embodiments, the tab 202 can be soldered directly to the hole 206 to make both an electrical and mechanical connection. In some embodiments, the radiating element is mechanically held to the PCB board with glue applied to the tab area for additional strength. Non-conductive glue may be applied near the hole and tab area to hold the radiating element in place.

The radiating element 201 can include, for example, electrically conductive material, such as copper and silver. Although the antenna in FIG. 1 is illustrated as a round antenna, embodiments of the present inventive concept are not limited to this configuration. For example, the antenna can take any shape to achieve the desired antenna pattern without departing from the scope of the present inventive concept. Anisotropic antenna patterns can also be created by changing the shape and size of the radiating element 201 and/or the PCB 205. In some embodiments, the radiating element 201 may be round except for a small tab 202 at the bottom as illustrated in FIG. 1. The width of the tab 202 and thickness of the metal can be chosen such that the tab 202 fits through a hole 206 in the PCB 205. Examples of various embodiments of the antennas that may be used is discussed, for example, in International Application No. PCT/US2016/061075, the disclosure of which is hereby incorporated herein by reference as if set forth in its entirety.

Electrical power and data are run through the plurality of wires 204 that connect to the PCB 205 at the connection points 203. The plurality of wires 204 can, for example, be soldered directly to the board, attached with a connector and the like. In some embodiments, the plurality of wires 204 protrude from a side portion of the PCB 205. In some embodiments, the plurality of wires 204 may run away from the board such that the plurality of wires 204 and a face of the radiating element 201 lie in the same plane. These embodiments may further reduce any distortion to the isotropic antenna pattern. Furthermore, in addition to power, additional data lines can run out of the PCB 205. In some embodiments, the data and power lines can serve as lines for a universal serial bus (USB) connection. In some embodiments, lines for a universal asynchronous receiver/transmitted (UART) can be used. The connector could be any number of standard power connectors. In some embodiments, the connector is a standard 120V AC wall plug. In further embodiments, the connector is any type of light bulb socket. Although not illustrated in FIG. 1, in some embodiments, a battery may be integrated onto the PCB 205. In these embodiments, the plurality of wires 204 and associated connectors 203 may or may not be necessary since power is provided by the battery.

However, as discussed above, the standard power options may not be reasonable for providing wireless communications in an area, building or country where the standard power options are not readily available. Thus, as will be discussed below, some embodiments of the present inventive concept provide a gateway in combination with an adapter that enables multiple devices to be daisy chained together to cover a significant distance and be powered by/through the cable therebetween, for example, an Ethernet cable. As used herein, "daisy chained" refers to connecting two or more devices together in a linear series.

Figure 7:
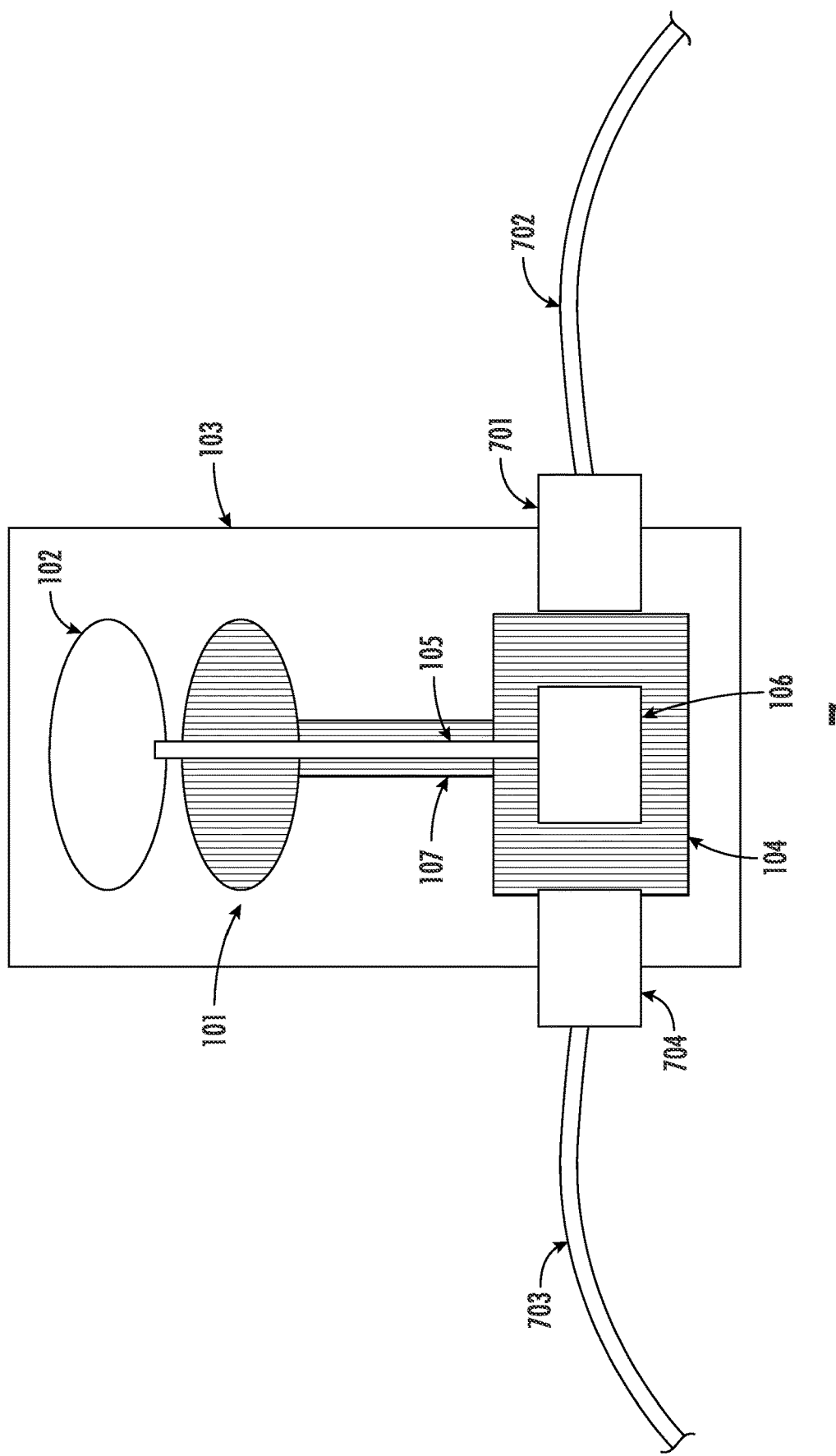
FIG. 7 is a block diagram of an antenna in accordance with some embodiments of the present inventive concept.

It will be understood that the antenna illustrated in FIG. 1 is provided for example only and embodiments discussed herein are not limited thereto. For example, an antenna on a PCB in accordance with further embodiments of the present inventive concept will be discussed with respect to FIG. 7. As illustrated in FIG. 7, the elements of the antenna are provided on a PCB 103. The antenna elements include a ground plane 101 for the antenna, a radiating element 102 of the antenna, a ground plane 104 for the radio frequency (RF) electronics, a stripline 105 electrically connecting the radiating element 102 to RF electronics 106 on the PCB 103 and a ground connect 107 between the ground plane for the antenna 101 and the ground plane for the RF electronics 104.

As further illustrated, the antenna system further includes jacks 701 and 704 on either side of the PCB 103. These jacks 701 and 704 may be, for example, RJ45 Ethernet jacks, however embodiments of the present inventive concept are not limited to this configuration. In particular, Ethernet jacks 701 and 704 may connect to PCB board 103 and cables 702 and 703 may provide power and data communication capabilities. For example, cable 702 may provide the power to the antenna device along with providing two-way communication. Similarly, cable 703 may provide power from the antenna device to the next one along the daisy chain as discussed further herein with respect to FIG. 2A.

Figure 2A:
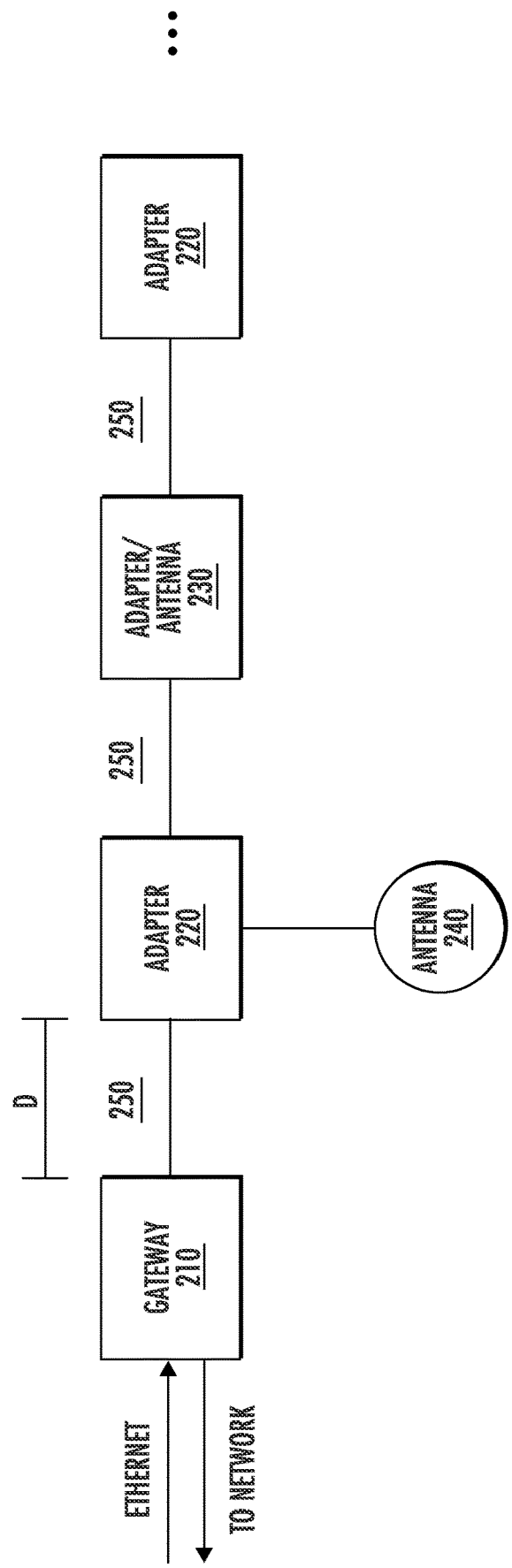
FIG. 2A is a block diagram of a system including a gateway and adapters in accordance with some embodiments of the present inventive concept.

Referring now to FIG. 2A, a system in accordance with some embodiments of the present inventive concept including a gateway, adapters, antenna and combination adapter/antenna will be discussed. As illustrated in FIG. 2A, the system 200 includes a gateway 210, an adapter 220 coupled to an antenna 240, and a combination antenna and adapter 230. It will be understood that system of FIG. 2A is provided as an example only and that more or less of each element may be provided without departing from the scope of the present inventive concept. As indicated by the ellipses in FIG. 2A, more devices may be daisy chained together to provide coverage over a substantial distance. In some embodiments, ten or more devices may be connected together without departing from the scope of the present inventive concept.

In particular, the gateway 210 may be an Ethernet gateway that is configured to receive Ethernet and provide data and power via cables 250 to the antennas 240, the adapters 220 and combination units 230. The Ethernet may be 10/100 Base-Y Ethernet is some embodiments. For example, the cable 250 may be a Category 5 (Cats) cable using RS-422, but is not limited to this configuration. For example, the cable may use RS-485 without departing from the scope of the present inventive concept. The distance D between units may be customized as needed and in some embodiments may be up to 100 feet. Thus, in some embodiments when ten devices are daisy chained with 100 feet between them, a large area may be covered without using conventional power receptacles.

As discussed above, the gateway 210 may provide data and power to the devices connected thereto, but may also receive data from the devices in the system. The data provided by the devices (antennas) may be used for location purposes. In some embodiments, data can be sent directly to the Ethernet gateway over the cables directly to a server (location server) such that the antenna band (UWB RF band) can be used mostly for location purposes instead of generic data transmission. Furthermore, as illustrated in FIG. 2B, in some embodiments a gateways 210 may include a USB connection 212 such that the gateway 210 may also host an antenna. Including the USB connection 212 in the gateway 210 adds versatility to the system by allowing the addition of one more antenna to the network without the addition of another adapter.

In some embodiments, the gateways 210 may be configured to perform an auto-detection algorithm to detect both antennas and adapters directly connected to the ports thereof. Having the gateway perform the discovery operation may be faster than detecting the antennas from a remote client device. Furthermore, in systems having the correct amount of processing resources at the Central Processing Unit (CPU), the gateway may be configured to run all algorithms necessary to control the connected antennas. Furthermore, in some embodiments, the gateway 210 can act as a rest application program interface (API) server to provide location data (x,y,z) to remote clients.

The gateway 210 may be coupled to the cable 250 via any means known to those having skill in the art, for example, via a universal serial bus (USB) connection. The gateway 210 allows selection of ports and packet schemes for communication, for example, UDP and TCP, and also provides various methods of encryption for the data being communicated. In some embodiments, the throughput of the system may be about 4 megabits per second.

Although embodiments are discussed herein as using Ethernet to power antennas and adapters for a particular system, embodiments of the present inventive concept may not be limited to this configuration. For example, systems, devices and methods discussed herein may be used to provide power to anything that needs power, for example, whole house power without departing from the scope of the present inventive concept.

As discussed above, the adapter 220 is connected to the gateway 210 over a cable 250, for example, a Cat5 Ethernet cable. The adapter 220 is configured to connect to an antenna 240 that receives location information in accordance with location systems provided by Wiser Systems. The location information may be provided over the air by the antenna 240 or over the cable 250 in some embodiments. Some embodiments provide a combined antenna/adapter 230 so that an external antenna 240 is not necessary. The adapters allow lengths of cable 250 having a distance D to be connected together through the adapter 220 in daisy chain. In some embodiments, up to ten devices can be daisy chained together. As discussed above with respect to the gateway 210, the adapter 220 and the adapter/antenna 230 can be connected to the cable 250 using any known method. However, in some embodiments, the cable 250 connected using a USB connection.

Figure 2C:
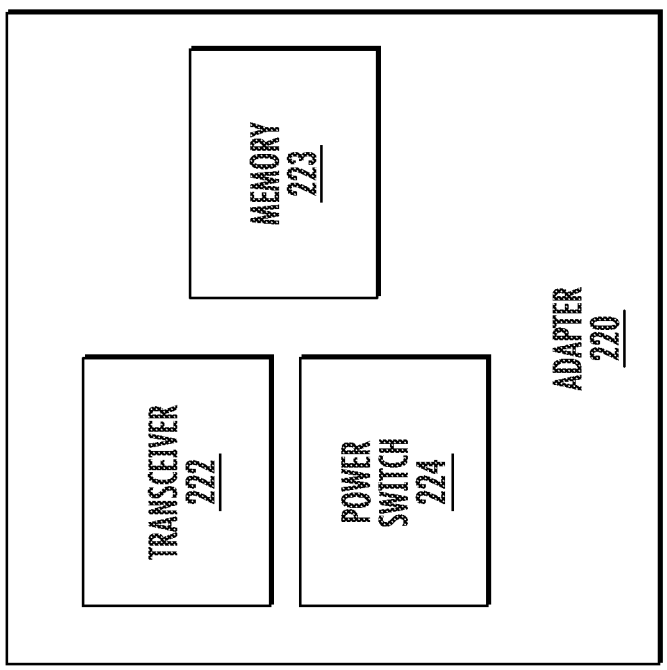
FIG. 2C is a more detailed block diagram of an adapter in accordance with some embodiments of the present inventive concept.
Figure 2B:
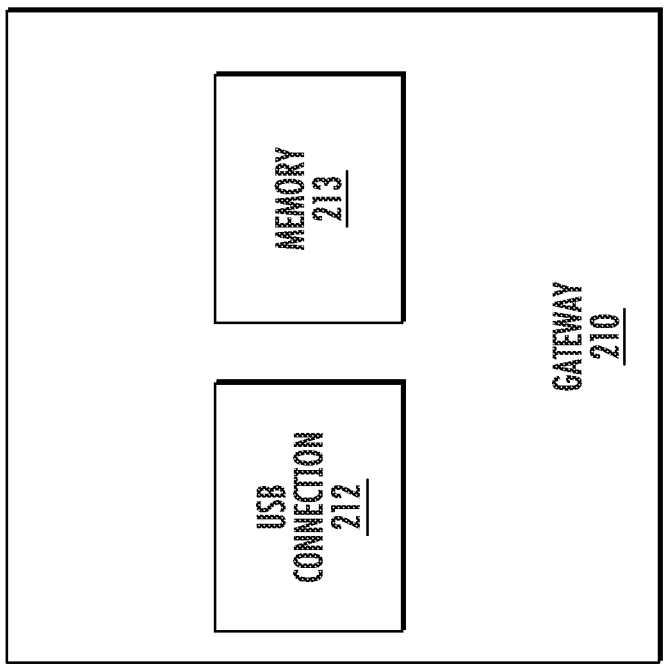
FIG. 2B is a more detailed block diagram of a gateway in accordance with some embodiments of the present inventive concept.

As illustrated in, FIG. 2C, in some embodiments the adapter 220 may include a power switch 224 that may be used to turn on and off the transceiver 222. The power switch 224 allows the transceivers to be turned on at different time and not all at once. If all the transceivers 222 are turned on at the same time, a big voltage bounce may occur, which can be detrimental to the electronics. Accordingly, to reduce the magnitude of the voltage bounce, in some embodiments a slight delay is induced between powering on each transceiver. The transceivers 222 may be turned on using a command communicated along the cable to the adapter to turn on and off the power. Furthermore, providing the power switch 224 in the adapter may allow the antennas to be remotely reset via the adapter if necessary, for example, if the antennas freeze and need to be rebooted.

Thus, in some embodiments, adapters 220 may provide a means to communicate with and power an antenna. The antenna may be a standalone antenna or a combination adapter/antenna. Adaptors may be powered by and can send/receive data from a single cable, for example, Ethernet cable. However, it will be understood that an Ethernet protocol may not be used. In some embodiments, the adapter 220 has an out connector for powering and sending data to additional adapters through the single cable. As discussed, adapters 220 have the ability to be affixed to walls, ceilings, and the like, in open, high areas where the antennas need to operate but typically do not have access to conventional power sources. Furthermore, in some embodiments, the adapters 220 may be included in existing lights, exit signs, other powered devices affixed to walls, ceilings, windows, doors and the like without departing from the scope of the present inventive concept.

As further illustrated in FIGS. 2B and 2C, the gateways 210 and adapters 220 may include memory 213 and 223, respectively. This memory 213 and 223 may be used to store data, such as data rate, error rate, voltage swings, and the like that may give the user an indication of the health of the system. This information may be reported from the gateway 210 and/or adapter 220 upon request via a communication channel. This data can be used to discern potential issues with connections/cable lengths/baud rates and the like before the issue becomes catastrophic. Firmware in the gateways/adapters may be remotely updated in accordance with some embodiments.

It will be understood that gateways and/or adapters in accordance with embodiments discussed herein may take many forms without departing from the scope of the present inventive concept. For example, a gateway may be used as a part of a client server model or the gateway may be used as a REST API server and the gateway can provide location data to remote clients. In some embodiments, gateways may be configured to discover the configuration of adapter/antenna network.

Some embodiments use a non-stateful addressing schema to allow adapters to communicate with the gateway and be used without any setup, as well as be reordered and swapped out without extra configuration. In some embodiments, gateways communicate with adapters without requiring the adapters to save the state of their address. For example, the gateway sends a command along the port telling it to go to the 'n' th adapter. For each consecutive receiving adapter, it reads the 'n' value and then decrements the 'n' value. If the 'n' value is not zero, it sends it on to the next adapter. If it is zero, then it sends it to the connected antenna. Not only can the adapter relay the message to its connected antenna but the adapter can also make a determination that the message was for itself and then act on the command/request based on the message contents.

In some embodiments, the combination units and adapters may have a backup power means associated therewith to allow power to be maintained in the event that the Ethernet fails. For example, each device may be provided with a backup battery that will maintain power for a predetermined period of time, for example, two hours.

As will be understood, not all environments lend themselves to have electronic equipment set up in various locations. For example, a large warehouse or manufacturing environment may not have locations where electronic equipment can be readily positioned. A block diagram of an example configuration in a warehouse environment will be discussed with respect to FIG. 3. As illustrated therein, a cable 360, for example, a steel cable, can be strung between two pillars 375 in a warehouse environment. The cable 250 from the Ethernet gateway (FIG. 2A) can be run along the steel cable 260 through the adapters 220 and the combination units 230. As illustrated in FIG. 3, some of the adapters have antennas 240 attached thereto and others do not. In some embodiments, the voltage in the cables may be greater than 10 Volts, for example, 24V, which may reduce the power loss over the cables. In some embodiments, the adapters include a step down DC/DC converter to convert the voltage received to a typical digital voltage (ex. 5V and/or 3.3V). It will be understood that although embodiments are discussed herein with respect to DC voltage, embodiments of the present inventive concept are not limited thereto. AC voltage may be used without departing from the scope of the present inventive concept.

It will be understood that there is a relationship between the length of the line (cable) and the speed of transmission. Some embodiments of the present inventive concept are configured to dynamically change the baud rate based on the length of the line. The baud rate is the rate at which information is transferred in a communication channel. In these embodiments, a length of the line may be measured using, for example, two adjacent antennas (UWB) to measure their absolute distance which gives some insight into the total line length. Alternatively, in some embodiments, two adapters may be configured to send a plurality of packets to one another and measure the error rate of the packets. Baud rates can be adjusted until a tolerable error rate is achieved. An algorithm can be used to dynamically switch from a "safe" slow baud rate to a faster baud rate which may or may not work and then back to a "safe" one again. As used herein, a "safe" baud rate refers to a baud rate in which the error rate of the packets is negligible. In other words, a safe baud rate would be one that reduces, or possibly minimizes or totally mitigates, errors in the transmission channel. Generally, if a bit gets flipped the entire message is discarded, which will usually result in resending the message or a portion of data being lost. A safe baud rate reduced the likelihood that this will happen.

It will be understood that any means known to those having skill in the art may be used to attach the adapters 220, the combination units 230 and the antennas 240. For example, in some embodiments a mount may be provided to connect to the antenna around the cable 360. For example, as illustrated in FIG. 4, an antenna 240 is coupled to a cable 360 using a connector 485. The connector 485, provided as an example only, has a clasp design. In particular, the connector 485 has two plates that join together to clasp the antenna 240 and cable 360 together. In some embodiments, the two halves of the connector 485 are configured to meet and be screwed in place so that the two halves clasp around the cable 360 and hold the antenna in place on the cable.

Figure 5:
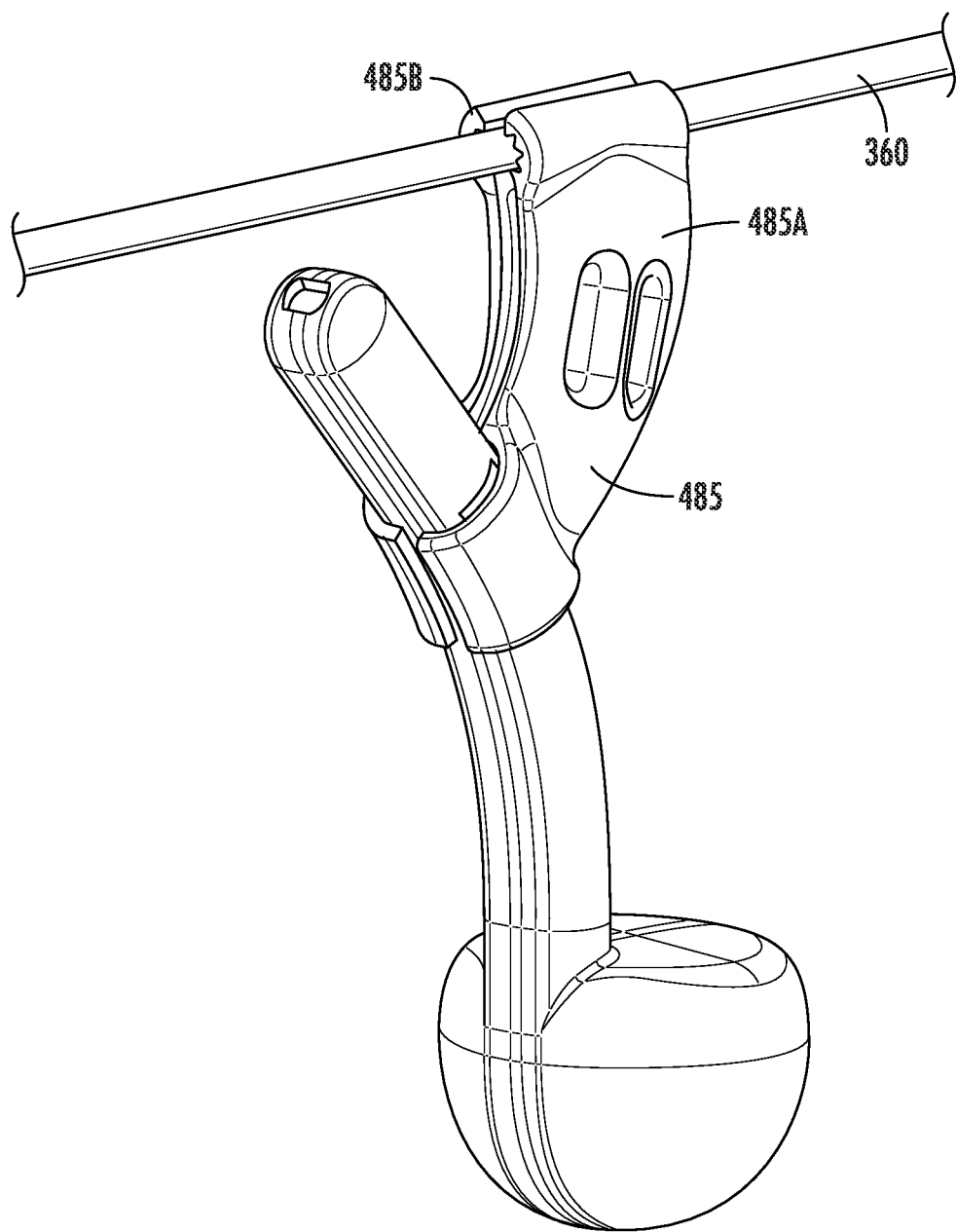
FIG. 5 is a diagram illustrating an antenna attached to a cable in accordance with some embodiments.
Figure 6A:
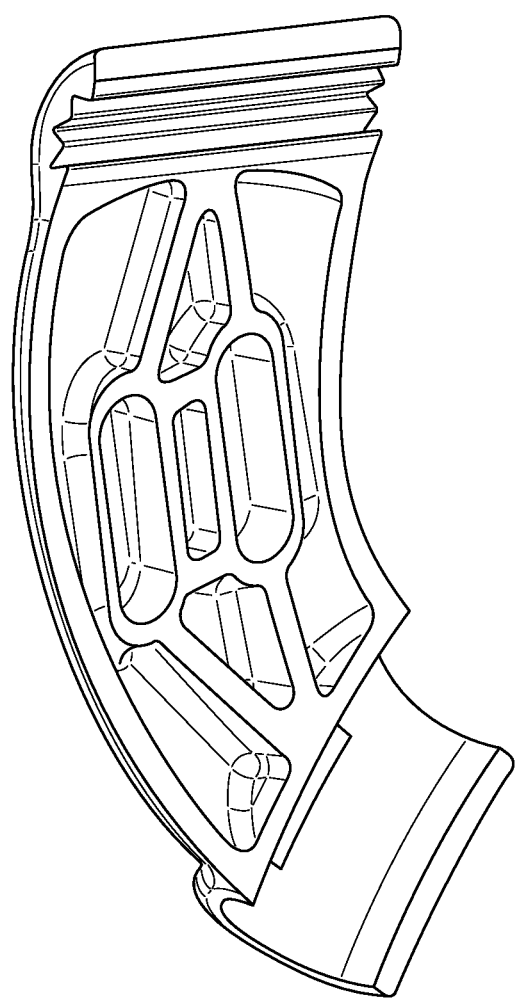
FIGS. 6A and 6B are perspective and side views of a single side of the connector in accordance with some embodiments of the present inventive concept.
Figure 6B:
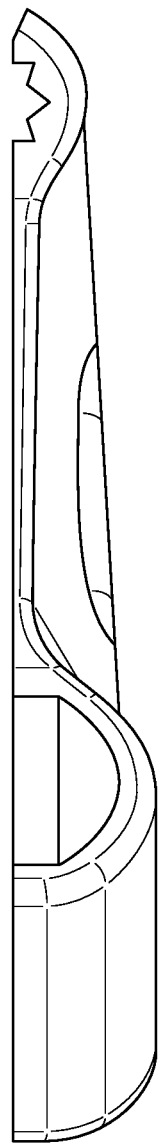

An example connector 485 is illustrated in FIG. 5 on a cable 360. As illustrated in FIG. 5, the connector 485 had two pieces 485A and 485B that grip the cable 360 and the antenna therebetween. Referring to FIGS. 6A and 6B, a perspective and side view, respectively, of one half the connector are illustrated. The corresponding half would mirror these.

Example specifications for the gateway and the adapter in accordance with some embodiments will be provided. However, embodiments of the present inventive concept are not limited thereto. The gateway may have an input voltage of from about 37 to about 57 volts; an output voltage of about 24 volts; and a current of up to about 375 mA. The standard conformed to may be IEEE802.3af and the enclosure for the gateway may have the following dimensions 3.6 inches×2.6 inches×1.1 inches. Similarly, the adapter may have a voltage of about 24 volts; a current of about 4 mA without a USB device and 30 mA with a USB device and be connected to other devices using RS422. The dimensions of the adapter enclosure may be 2.6 inches×2.6 inches×1.1 inches. It will be understood that the details discussed herein are provided for example only and that embodiments of the present inventive concept are not limited thereto. For example, voltages measured in both alternative current (AC) and direct current (DC) may be used without departing from the scope of the present inventive concept.

As briefly discussed above, some embodiments of the present inventive concept provide an Ethernet gateway that provides both power and data to/from antennas in a system. The antennas may be daisy chained together using adapters associated therewith. Thus, embodiments of the present inventive concept may be adapted to provide wireless communications between devices without having to provide a conventional power source for each device in the system.

Thus, some embodiments of the present inventive concept allow adapters to be separated by much longer lengths of cable (for example, up to 100 feet), which lends itself to antennas as they are generally placed relatively far apart. Conventional systems including, for example, USB hubs generally cannot support such lengths. Furthermore, embodiments of the present application further allow much higher voltages over the cable compared to conventional USB systems, which allows power to be transferred at less of a loss.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A system for providing power and data to a device using a single cable between devices, the system comprising:
   at least one gateway that provides power and data to at least one device in the system over a single, non-fiber optic cable; and
   at least one adapter coupled to the gateway and the at least one device using the single cable, wherein each of the at least one adapters couples a single length of cable between devices and each single length of cable transfers both data and power received at each of the at least one adapters directly from a next device of the devices;
   wherein each of the at least one adapters includes a physically separate jack that receives a connector of a single corresponding single cable therein and wherein the single cable has a single connector on both ends of the single length of cable; and
   wherein each of the at least one gateway, at least one device and at least one adapter only receive a single gateway, adapter and/or device at each connector such that the gateways, adapters and devices are connected together in a single line.

2. The system of claim 1, wherein the single cable complies with one of an RS-422 signaling standard or an RS-485 signaling standard.

3. The system of claim 1, wherein a distance between devices is up to 100 feet.

4. The system of claim 1:
   wherein the at least one device comprises an antenna and wherein the at least one adapter is coupled to the antenna that is powered by the system;
   wherein data is communicated to the at least one gateway over the single length of cable directly to a server; and
   wherein the server uses signals from the antenna to provide location information.

5. The system of claim 1, wherein the at least one adapter comprises a universal serial bus connection that receives a connection to the antenna.

6. The system of claim 1, wherein the at least one gateway comprises a rest application program interface (API) server to provide location data (x,y,z) to remote clients.

7. The system of claim 1, wherein the system provides power to anything that needs power.

8. The system of claim 1, wherein up to ten devices are coupled together by the system.

9. The system of claim 1, wherein the at least one adapter are affixed to walls and/or ceilings in open, high areas where antennas are needed but do not have access to conventional power sources.

10. The system of claim 1, wherein the at least one adapter is positioned in one of an existing light fixture, exit sign, and other powered devices affixed to walls, ceilings and/or windows.

11. The system of claim 1, wherein the at least one adapter and/or gateway have backup power means associated therewith to allow power to be maintained in event of failure.

12. The system of claim 11, wherein each device has a backup battery that maintains power for a predetermined period of time.

13. The system of claim 1, wherein the single cable comprises a single physical cable that is made up of multiple electrically conducting wires used to transfer both data and power between devices.

* * * * *